Patented Oct. 31, 1939

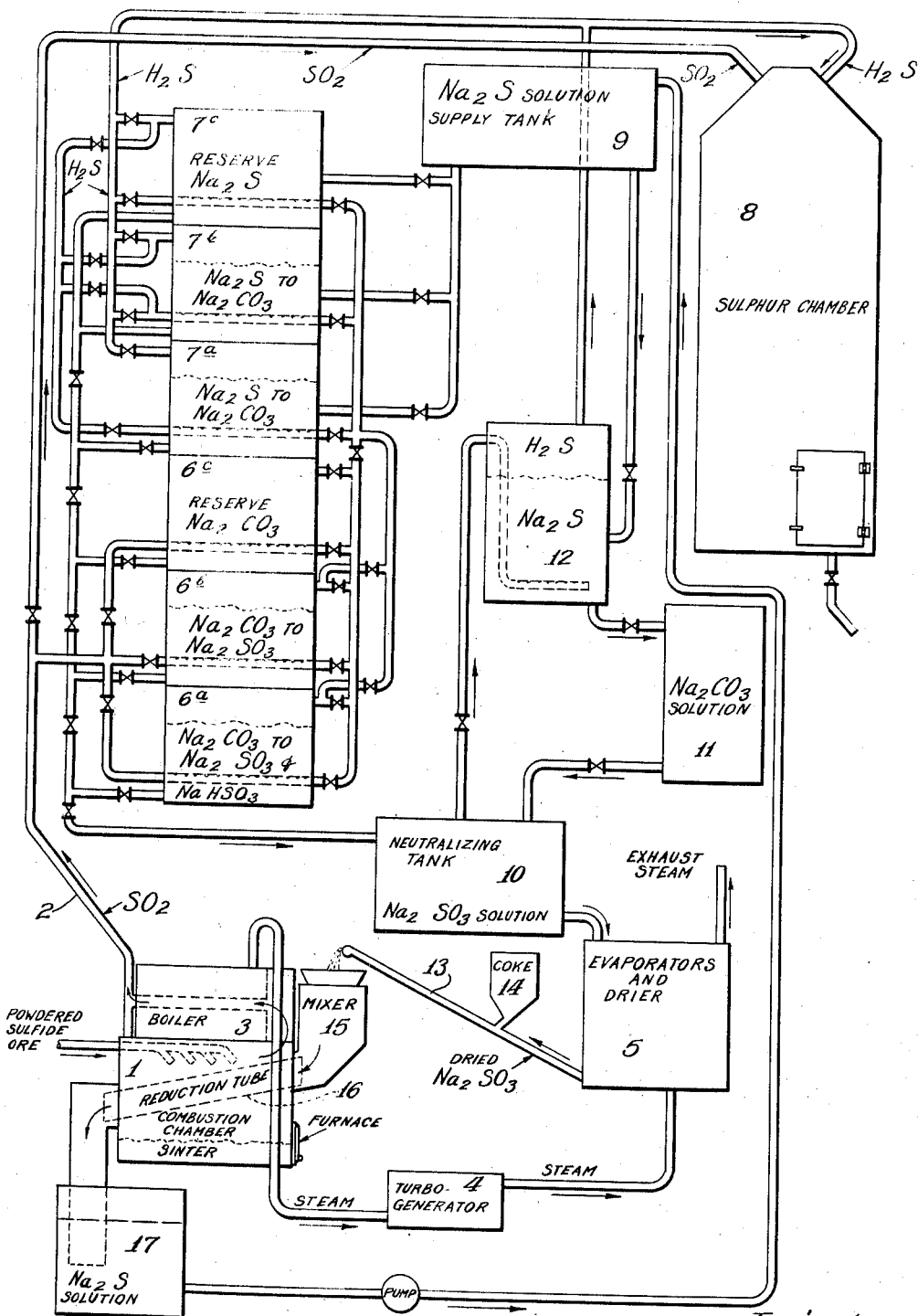

2,177,707

UNITED STATES PATENT OFFICE 2,177,707

METHOD OF MAKING ELEMENTAL SULPHUR FROM ORES AND GASES CONTAINING SULPHUR

Gant Gaither, Hopkinsville, Ky.

Application May 8, 1939, Serial No. 272,317

1 Claim. (Cl. 23—225)

This discovery relates to the production of elemental sulphur obtained from ores and gases containing sulphur.

This application is the continuation in part of application No. 189,131.

I have discovered an improvement in the method of producing elemental sulphur from the method disclosed in my Patent No. 2,163,554, issued June 20, 1939, consists of the following:

The first improvement is the elimination of the barium sulphite-barium sulphide cycle.

It has been discovered in plant practice that by neutralizing the acid sodium sulphite formed in the first chamber of the bubble tank, shown in my application 189,131, in a separate neutralizing tank using sodium carbonate solution for the purpose until completely neutralized sodium sulphite is formed, can be utilized after evaporating of water from the solution to give normal sodium sulphite salt. Instead of barium sulphite, this normal sodium sulphite in this new and improved process is mixed with carbon and put through the reduction furnace, reducing it to sodium sulphide. By this step the waste of the insoluble barium salts not always reduced to barium sulphide is eliminated, because any of the sodium sulphite not completely reduced in the furnace to sodium sulphide is still left in a soluble form and when the solution is made of the sodium sulphide the unreduced sodium compounds go into the solution with the sodium sulphide. This will become a constant (being a very small per cent) of a definite amount in either process for no reduction furnace will reduce either barium sulphite or sodium sulphite to the corresponding sulphides one hundred percent. The solution of sodium sulphide containing a small constant per cent of unreduced sodium compound is carried to the head of the reaction chambers and through the process. These unreduced compounds are not acted upon in either the carbonating or sulphiting chambers and come through to the reduction furnace again where they will have their chance to be reduced, thus preserving for the cycle the sodium radical which small amount in the barium process is lost through insolubility. This improvement eliminates one extra compound and lessens the weight of the burden through the process because barium is many times heavier than sodium.

In addition another improvement over the method of handling fluids in the reaction chambers, as shown in my above referred to application, is to have adequate controls of these reaction chambers so that no liquids can pass from one chamber to another until by tests the reactions desired to occur in each chamber shall have been completed.

The figures on the drawing show the direction of flow of the various elements and are described as follows:

Sulphide ore (preferably powdered) is introduced into the combustion chamber 1 where it is burned, with the proper amount of air, to sulphur dioxide, $SO_2$. If the sulphide ore used is pyrite, the reaction is: $2FeS_2 + 11O \rightarrow Fe_2O_3 + 4SO_2$. The metallic oxide ($Fe_2O_3$) is removed from the bottom, and the $SO_2$ passes into the process through pipe 2. This gas passes through the waste heat boiler 3 which generates steam for the operation of the turbine generator 4 which produces electric current for running the various pumps, conveyors, etc., in the process. The exhaust steam from the turbine generator passes into the evaporators 5 for removing the water from the sodium sulphite solution thus forming the dry sodium sulphite ready for reduction (with the addition of carbon) to sodium sulphide.

A part of the sulphur dioxide passes into the conversion system, which is composed of 6 compartments, 3 for sodium carbonate solution (6—a—b—c), and 3 for sodium sulphide solution 7a—b—c. The $SO_2$ passes into 6—a, where the following chemical reactions take place:

(1) $SO_2 + Na_2CO_3 \rightarrow Na_2SO_3 + CO_2$
(2) $SO_2 + Na_2SO_3 + H_2O \rightarrow 2NaHSO_3$

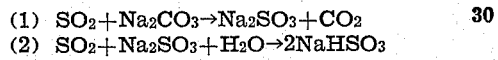

The gas, then mostly carbon dioxide, $CO_2$, passes into 6—b, which is used as a guard chamber to prevent any unconverted $SO_2$ from passing into the sodium sulphide solution. The gas, $CO_2$, then passes into the sodium sulphide chamber 7—a, where the following conversion takes place, liberating hydrogen sulphide, as follows:

$CO_2 + Na_2S + H_2O \rightarrow Na_2CO_3 + H_2S$

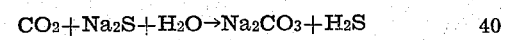

(This chamber is preferably heated to prevent formation of bicarbonate.) This gas (hydrogen sulphide) passes through chamber 7—b (also a guard chamber) and from there passes over into the sulphur chamber 8. (Chambers 6—c and 7—c are used as reserves, while refilling the saturated chambers.) Sulphur dioxide from the main supply 2 is also passed into the sulphur chamber 8 where it is combined with the hydrogen sulphide in the formation of sulphur and water, thus: $SO_2 + 2H_2S \rightarrow 2H_2O + 3S$. The sulphur is removed from this chamber. The sodium sulphide supply tank is shown at 9 and supplies chambers 7—a, 7—b, and 7—c. As the sulphide is converted into carbonate in chambers 7—a—b—c as previously shown, it is transferred as needed to chambers 6—a—b—c where, as shown above, the carbonate solution is converted into sodium sulphite, also into sodium bisulphite, NaHSO₃. Finally, the bisulphite is run into the neutralizing tank 10 where it is converted into the normal sulphite (Na₂SO₃) by the introduction of sodium carbonate from tank 11.

$$2NaHSO_3 + Na_2CO_3 \rightarrow 2Na_2SO_3 + H_2O + CO_2$$

The CO₂ given off from this passes into the auxiliary tank 12 containing sodium sulphide from the main supply tank 9, and H₂S is given off which goes into the main H₂S supply, and into the sulphur tank 8. The sodium carbonate formed in tank 12 is the supply for tank 11. The sodium sulphite solution from tank 10 passes into the evaporators and driers 5 and the dry sulphite is transferred on conveyor 13 where the proper amount of carbon (coke) is added from bin 14 for the reduction.

$$2Na_2SO_3 + 3C \rightarrow 2Na_2S + 3CO_2$$

This is thoroughly mixed in 15 and passes through the reduction tube 16 which is heated by the combustion of the sulphide ore in furnace 1. The reduced mass, mostly sodium sulphide, Na₂S, is discharged into water in 17 thus making sodium sulphide solution which is pumped into supply tank 9 for cyclic use as before.

The same chemical reactions are made use of as in my previous amended application, except that reactions relating to barium are eliminated, and one reaction is new to the application being number 6 below.

*Chemical reactions*

(1) $SO_2 + Na_2CO_3 \rightarrow Na_2SO_3 + CO_2$
(2) $CO_2 + Na_2S + H_2O \rightarrow Na_2CO_3 + H_2S$
(3) $H_2S + 3O \rightarrow H_2O + SO_2$
(4) $SO_2 + 2H_2S \rightarrow 2H_2O + 3S$
(5) $H_2S + O \rightarrow H_2O + S$
(6) $2Na_2SO_3 + 3C \rightarrow 2Na_2S + 3CO_2$ The attached flow sheet shows schematically the entire course and cycle of the production.

What I claim is:

A cyclic process for preparing sulphur from sulphur dioxide which comprises the steps of absorbing sulphur dioxide in an alkali carbonate solution whereby carbon dioxide gas and an acid alkali sulphite solution are formed, neutralizing said acid alkali sulphite with alkali carbonate to form carbon dioxide gas and a neutral solution of alkali sulphite, evaporating said neutral alkali sulphite solution, mixing said evaporated alkali sulphite with carbon and subjecting the mixture to heat to reduce alkali sulphite to alkali sulphide, dissolving said alkali sulphide and recycling the alkali sulphide solution thus produced to react with carbon dioxide evolved in said steps of absorbing of sulphur dioxide and neutralizing acid alkali sulphite, whereby hydrogen sulphide and alkali carbonate solution are formed, recycling said alkali carbonate solution to said steps of absorbing sulphur dioxide and neutralizing acid alkali sulphite solution, and reacting said hydrogen sulphide with sulphur dioxide to produce elemental sulphur and water.

GANT GAITHER.